United States Patent
Haubs et al.

(10) Patent No.: US 8,481,671 B2
(45) Date of Patent: Jul. 9, 2013

(54) OXYMETHYLENE POLYMERS AND PROCESS FOR THE PREPARATION THEREOF

(75) Inventors: Michael Haubs, Bad Kreuznach (DE); Michael Hoffmockel, Niedernhausen (DE); Jurgen Lingnau, Mainz (DE); Robert M. Gronner, Erlanger, KY (US); Lowell Larson, Independence, KY (US)

(73) Assignee: Ticona GmbH, Sulzbach (DE)

( * ) Notice: Subject to any disclaimer, the term of this patent is extended or adjusted under 35 U.S.C. 154(b) by 310 days.

(21) Appl. No.: 12/787,698

(22) Filed: May 26, 2010

(65) Prior Publication Data

US 2011/0077378 A1  Mar. 31, 2011

Related U.S. Application Data

(60) Provisional application No. 61/245,722, filed on Sep. 25, 2009.

(51) Int. Cl.
| C08G 16/02 | (2006.01) |
| C08G 16/04 | (2006.01) |
| C08G 16/00 | (2006.01) |
| C08G 4/00  | (2006.01) |

(52) U.S. Cl.
    USPC ........... 528/235; 528/230; 528/242; 528/425; 528/486

(58) Field of Classification Search
    USPC ..................... 528/230, 242, 425, 235, 486
    See application file for complete search history.

(56) References Cited

U.S. PATENT DOCUMENTS

| 3,288,756 | A | 11/1966 | Buckley |
| 4,087,411 | A | 5/1978 | Sugio et al. |
| 4,115,369 | A | 9/1978 | Sugio et al. |
| 5,248,762 | A | 9/1993 | Yamamoto et al. |
| 5,608,030 | A | 3/1997 | Hoffmockel et al. |
| 7,022,805 | B2 * | 4/2006 | Haubs et al. ........... 528/242 |
| 7,812,110 | B2 * | 10/2010 | Haubs et al. ........... 528/230 |
| 7,943,726 | B2 * | 5/2011 | Haubs et al. ........... 528/365 |
| 8,133,966 | B2 * | 3/2012 | Haubs et al. ........... 528/230 |
| 2007/0179273 | A1 | 8/2007 | Haubs et al. |
| 2008/0097077 | A1 | 4/2008 | Assmann et al. |
| 2009/0270587 | A1 | 10/2009 | Haubs et al. |

FOREIGN PATENT DOCUMENTS

| DE | 19633708 | 2/1997 |

(Continued)

OTHER PUBLICATIONS

EP Search Report for Application No. 10177264.8-2115—6 pages.

(Continued)

*Primary Examiner* — Duc Truong
(74) *Attorney, Agent, or Firm* — Dority & Manning, P.A.

(57) ABSTRACT

The present invention relates to a process for the preparation of oxymethylene polymers as well as oxymethylene polymers obtainable therefrom. The process includes polymerization of a monomer, which forms —$CH_2$—O— units in the presence of an acetal of formaldehyde or a polyhydric alcohol and an initiator for cationic polymerization. The initiator may be a heteropoly acid or an acid salt thereof which is dissolved in an alkyl ester of a polybasic carboxylic acid.

19 Claims, 1 Drawing Sheet

FOREIGN PATENT DOCUMENTS

| | | |
|---|---|---|
| EP | 0504405 | 9/1992 |
| EP | 0638599 | 2/1995 |
| EP | 0716105 | 6/1996 |
| JP | 2003/026746 | 1/2003 |
| JP | 2009/215340 | 9/2009 |
| WO | WO 2006/045579 | 5/2006 |
| WO | WO 2009/127388 | 10/2009 |

OTHER PUBLICATIONS

Bednarek et al., "Hereropolyacids—New Efficient Initiators for Cationic Polymerization", Makromolekulare Chemie, Huthig Und Wepf Verlag, Basel, Switzerland, vol. 190, No. 5, May 1, 1989, pp. 929-938.

Ogawa et al., "Proton-NMR Studies of Polyacetal Copolymers", Journal of Applied Polymer Science, vol. 28, 1989, pp. 87-94.

* cited by examiner

OXYMETHYLENE POLYMERS AND PROCESS FOR THE PREPARATION THEREOF

CROSS REFERENCE TO RELATED APPLICATION

The present application claims filing benefit of U.S. provisional patent application Ser. No. 61/245,722 filed on Sep. 25, 2009, which is hereby incorporated by reference in its entirety.

DESCRIPTION

Figure 1:
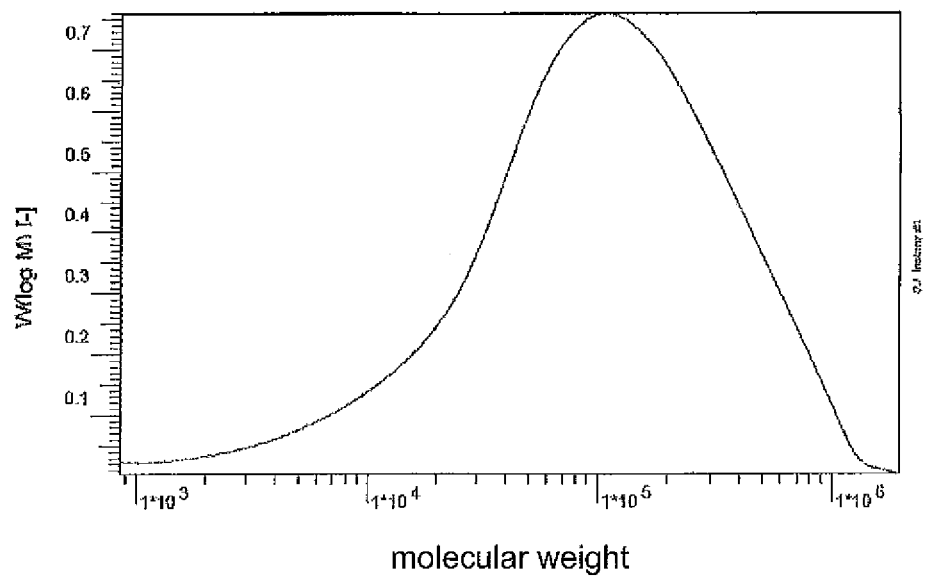
FIG. 1 is a Gel Permeation Chromatography (GPC) plot illustrating the results of Example 1.

The present invention relates to a process for the preparation of oxymethylene polymers as well as oxymethylene polymers obtainable therefrom.

Oxymethylene polymers are obtainable by the cationically or anionically initiated polymerization of formaldehyde.

A stable oxymethylene polymer can be prepared by subjecting monomers forming formaldehyde units, preferably trioxane, to cationic copolymerization with small amounts of comonomers and thereby incorporating small amounts of oxyalkylene units substantially randomly into the chain. The molecular weight regulation is effected by transfer agents, as a rule dialkyl formals. By degradation of the unstable ends up to the first oxyalkylene unit in an alkali medium (hydrolysis), copolymers which have stable terminal hydroxyalkyl groups (from the comonomer) and terminal alkyl groups (from the transfer agent) are thus obtained. Thus, for example, EP-A-504,405 discloses oxymethylene polymers which contain small proportions of other oxyalkylene units, in particular of oxyethylene units, in addition to oxymethylene units and which have a low content of terminal formyl groups. The proportion of the other oxyalkylene units, based on the proportion of the oxymethylene units, is from 0.07 to 0.5 mol %. At less than said content of oxyalkylene units, polymers having insufficient heat stability and hot water stability form. The polymers are prepared in the presence of a selected amount of a perfluoroalkanesulfonic acid (derivative) as a catalyst, and monomers having a low content of water and of formic acid are used. The deactivation of the polymerization mixture is affected by addition of selected crystalline basic adsorbents, for example of oxides or of hydroxides of alkali metals or alkaline earth metals. Accordingly, it is also possible to prepare copolymers having a relatively high content of oxyalkylene units.

Under said polymerization conditions, the polymer formed is precipitated in the early phase of the polymerization, regardless of whether the mass polymerization, a polymerization in the presence of an inert solvent or a suspension polymerization is carried out. This subsequently always leads to a bimodal molecular weight distribution: a maximum in the curve of the molecular weight distribution is typically present at comparatively low molecular weights, for example at from 2,000 to 5,000 Dalton; a further maximum in the curve of the molecular weight distribution is typically present at comparatively high molecular weights, for example at 50,000-200,000 Dalton. The mass fraction of the low molecular weight fraction is from 5 to 15%. The low molecular weight fraction can be determined by gel permeation chromatography (GPC). These significant amounts of the low molecular weight fraction have a not inconsiderable influence on the mechanical properties of the polymer.

On the other hand, oxymethylene polymers which have a monomodal molecular weight distribution and are distinguished by improved impact strength and flexural modulus of elasticity are also known (EP 0 716 105 A1) from the cationic polymerization of trioxane. The improvement is achieved by establishing a monomodal molar mass distribution, a comonomer content of from 0.3 to 0.9 mol % and a melt volume rate of from 1 to 5 $cm^3/10$ min.

The preparation of these polymers is effected by polymerization in the homogeneous phase at elevated temperature. As a result, secondary reactions occur to a greater extent and the polymer yield in the preparation is limited.

Finally, heteropolyacids are known as catalysts for the polymerization of monomers which form —$CH_2$—O— units.

DE 196 33 708 A1 discloses the polymerization of trioxane together with a comonomer in the presence of a heteropoly acid which is dissolved in di-n-butylether. Further, polymerization of 1,3,5-trioxane in the presence of heteropoly acids which are dissolved in butyl acetate is known (Macromol. Chem. 190, 929-938 (1989)).

However, the initiator systems (heteropoly acid and solvent) known in the prior art suffer from an insufficient hydrolysis stability. Further, the solvents which are necessary to dissolve the heteropoly acid which are mentioned in the prior art cause problems in a production plant.

The solvents known in the prior art to dissolve heteropoly acids are not inert under the conditions of the polymerization of trioxane and lead to a decreased molecular weight as well as instable end groups of the oxymethylene polymers obtained. Furthermore, the solvents used to dissolve heteropoly acids disclosed in the prior art cannot be separated easily from the production stream since azeotropic mixtures are formed with the trioxane. Additionally, the solvents disclosed in the prior art do not fulfill the safety aspects as well as the environmental aspects required.

It is an object of the present invention to provide an improved method for the preparation of oxymethylene polymers which demonstrate a monomodal distribution of the molecular weight of the oxymethylene polymers and which demonstrate a higher impact resistance. Further, it was an object of the present invention to provide a process for the preparation of oxymethylene polymers which does not cause problems in an upscaled process which are due to the nature of the solvent, i.e., solvents which are inert under the process conditions and which can easily be separated from the production stream without the use of additional equipment.

It has surprisingly been found that the above-mentioned problems can be solved by an initiator system comprising a heteropoly acid or an acid salt thereof which is dissolved in an alkyl ester of a polybasic carboxylic acid.

Accordingly, the first embodiment of the present invention is a mixture for the preparation of oxymethylene polymers comprising the following step:
polymerization of a monomer, which forms —$CH_2$—O— units in the presence of
i) an acetal of formaldehyde or a polyhydric alcohol and
ii) an initiator for cationic polymerization
wherein said initiator is a heteropoly acid or an acid salt thereof which is dissolved in an alkyl ester of a polybasic carboxylic acid.

The initiator for cationic polymerization is a heteropoly acid or an acid salt thereof. The heteropoly acid is a generic term for polyacids formed by the condensation of different kinds of oxo acids through dehydration and contains a mono- or poly-nuclear complex ion wherein a hetero element is present in the center and the oxo acid residues are condensed through oxygen atoms. Such a heteropoly acid is represented by formula (1):

$$H_x[M_mM'_nO_z]\cdot yH_2O \quad (1)$$

wherein
M represents an element selected from the group consisting of P, Si, Ge, Sn, As, Sb, U, Mn, Re, Cu, Ni, Ti, Co, Fe, Cr, Th and Ce,
M' represents an element selected from the group consisting of W, Mo, V and Nb,
m is 1 to 10,
n is 6 to 40,
z is 10 to 100,
x is an integer of 1 or above, and
y is 0 to 50.

According to a preferred embodiment of the method according to the present invention the heteropoly acid is a compound represented by the following formula:

$$H_x[M_mM'_nO_z]\cdot yH_2O$$

wherein
M represents an element selected from the group consisting of P and Si;
M' represents a coordinating element selected from the group consisting of W, Mo and V;
z is 10 to 100;
m is 1 to 10;
n is 6 to 40;
x is an integer of at least 1; and
y is 0 to 50.

In the heteropoly acid which is particularly effective as the initiator for cationic polymerization the central element (M) in the formula described above is composed of one or more kinds of elements selected from P and Si and the coordinate element (M') is composed of at least one element selected from W, Mo and V, particularly preferably W or Mo.

Further, acidic salts of heteropoly acids each having a form, in which any of the various metals substitutes for a part of H's (hydrogen atoms) in the formula (1) can also be used as the initiator in the method of the present invention.

Specific examples of heteropoly acids are selected from the group consisting of phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid, silicomolybdotungstovanadic acid and acid salts thereof.

Excellent results have been achieved with heteropoly acids selected from 12-molybdophosphoric acid ($H_3PMo_{12}O_{40}$) and 12-tungstophosphoric acid ($H_3PW_{12}O_{40}$) and mixtures thereof.

The amount of the heteropoly acid or the acid salt thereof to be used as an initiator for the polymerization of a monomer component, which forms —$CH_2$—O— units is 0.1 to 1000 ppm, preferably 0.2 to 40 ppm, more preferably 0.3 to 5 ppm based on the total amount of the monomer component.

The initiator for the cationic polymerization used in the method according to the present invention is dissolved in an alkyl ester of a polybasic carboxylic acid. It has surprisingly been found that alkyl esters of polybasic carboxylic acid are effective to dissolve the heteropoly acids or salts thereof at room temperature (25° C.). On the other hand, the solvent on basis of an alkyl ester of a polybasic carboxylic acid not only supports the reaction in terms of carrying out the reaction uniformly but additionally supports to achieve oxymethylene polymers having a monomodal molecular weight distribution and, furthermore, the alkyl ester of the polybasic carboxylic acid does not negatively affect the polymerization process in an upscale process carried out in a production plant.

Further, the alkyl ester of the polybasic carboxylic acid can easily be separated from the production stream since no azeotropic mixtures are formed. Additionally, the alkyl ester of the polybasic carboxylic acid used to dissolve the heteropoly acid or an acid salt thereof fulfils the safety aspects and environmental aspects and, moreover, is inert under the conditions for the manufacturing of oxymethylene polymers.

Preferably the alkyl ester of a polybasic carboxylic acid is an alkyl ester of an aliphatic dicarboxylic acid of formula (2):

$$(ROOC)—(CH_2)_n—(COOR') \quad (2)$$

wherein
n is an integer from 2 to 12, preferably 3 to 6 and
R and R' represent independently from each other an alkyl group having 1 to 4 carbon atoms, preferably selected from the group consisting of methyl, ethyl, n-propyl, iso-propyl, n-butyl, iso-butyl and tert.-butyl.

Especially preferably are the dimethyl or diethyl ester of the above-mentioned formula (2), particularly preferably is dimethyl adipate (DMA).

According to a preferred embodiment of the method according to the present invention, the alkyl ester of polybasic carboxylic acid is a compound of formula (3):

$$(ROOC)_2—CH—(CH_2)_m—CH—(COOR')_2 \quad (3)$$

wherein
m is an integer from 0 to 10, preferably from 2 to 4 and
R and R' are independently from each other alkyl groups having 1 to 4 carbon atoms, preferably selected from the group consisting of methyl, ethyl, n-propyl, iso-propyl, n-butyl, iso-butyl and tent.-butyl.

Particularly preferred components which can be used to dissolve the heteropoly acid according to formula (3) are butantetracarboxylic acid tetratethyl ester or butantetracarboxylic acid tetramethyl ester.

According to a further preferred embodiment of the method according to the present invention the alkyl ester of a polybasic carboxylic acid is an aromatic dicarboxylic acid ester of formula (4):

$$(ROOC)—C_6H_4—(COOR') \quad (4)$$

whereby R and R' represent independently from each other alkyl groups having 1 to 4 carbon atoms, preferably selected from the group consisting of methyl, ethyl, n-propyl, iso-propyl, n-butyl, iso-butyl and tert.-butyl.

Preferred aromatic dicarboxylic acid esters according to formula (4) are dimethylisophthalate, diethylisophthalate or dimethylterephthalate or diethylterephthalate.

Specific examples of the alkyl ester of a polybasic carboxylic acid are selected from the group consisting of dimethyl glutaric acid, dimethyl adipic acid, dimethyl pimelic acid, dimethyl suberic acid, diethyl glutaric acid, diethyl adipic acid, diethyl pimelic acid, diethyl suberic acid, diemethyl phthalic acid, dimethyl isophthalic acid, dimethyl terephthalic acid, diethyl phthalic acid, diethyl isophthalic acid, diethyl terephthalic acid, butantetracarboxylic acid tetramethylester and butantetracarboxylic acid tetraethylester as well as mixtures thereof.

The alkyl ester of the polybasic carboxylic acid which is used to dissolve the heteropoly acid can be solid at room temperature (25° C.) since the heteropoly acid or the acid salt thereof is preferably introduced to the reaction mixture at a higher temperature at which the alkyl ester of the polybasic carboxylic acid is liquid and at which the heteropoly acid can homogeneously be dissolved. According to a preferred embodiment of the method according to the present invention, the melting point of the alkyl ester of the polybasic carboxylic acid is lower than 100° C., preferably lower than 50° C. and more preferably lower than 25° C. On the other hand, it is desirable that the alkyl ester of the polybasic carboxylic acid does not evaporate under the reaction conditions. Therefore, it is preferably that the boiling point of the alkyl ester of the polybasic carboxylic acid at 1 bar is higher than 100° C., preferably higher than 150° C. and more preferably higher than 170° C.

It has been found that an alkyl ester of the polybasic carboxylic acid having a nitrogen atom negatively affects the polymerization process. Therefore, according to a preferred embodiment the alkyl ester of the polybasic carboxylic acid does not contain a nitrogen atom.

The alkyl ester of the polybasic carboxylic acid which is used to dissolve the heteropoly acid should not be harmful to the environment and is preferably commercially available and inexpensive.

Mixtures of the above-mentioned alkyl esters of polybasic carboxylic acids can also be used for example in order to lower the melting point of the solvent system.

Preferably, the heteropoly acid is dissolved in the alkyl ester of the polybasic carboxylic acid in an amount lower than 5 weight percent, preferably in an amount ranging from 0.01 to 5 weight percent, wherein the weight is based on the entire solution.

It has been found that concentrations higher than 5 weight percent of heteropoly acid tend to lead to an inhomogeneous initiation which can lead to the formation of a polymer precipitate at the injection point before the initiator can be thoroughly mixed with the monomer. The polymer precipitate can encapsulate the initiator and, as a consequence, no further polymerization might take place.

The method for the preparation of oxymethylene polymers which can be oxymethylene homopolymers or oxymethylene copolymers comprise the step of polymerizing a monomer which forms —$CH_2$—O— units. Monomers which form —$CH_2$—O— are preferably formaldehyde, tetroxane or more preferably trioxane.

Oxymethylene copolymers are derived from formaldehyde or from its cyclic oligomers, particularly from trioxane and from comonomers such as cyclic ethers, aldehydes, cyclic acetals which may have substitution if appropriate, and/or linear oligo- or polyacetals. Specific examples of comonomers which can be used in the method according to the present invention are ethylene oxide, propylene 1,2-oxide, butylenes 1,2-oxide, butylenes 1,3-oxide, 1,3-dioxane, 1,3-dioxolane, 1,3-dioxepane and 1,3,6-trioxocane.

The method for the preparation of oxymethylene polymers according to the present invention is preferably carried out by polymerization of polyoxymethylene-forming monomers, such as trioxane or a mixture of trioxane and dioxolane. The polymerization can be effected as precipitation polymerization or in particular in the melt.

The polymerization of the monomers which forms —$CH_2$—O— and optionally comonomers such as dioxolane is carried out in the presence of an acetal of formaldehyde which is used as a chain-transfer agent (regulator). Preferably, the acetal of formaldehyde is a compound of formula (5):

(5)

in which
$R^1$ and $R^2$ represent independently of each other alkyl groups, preferably methyl, and
q is an integer from 1 to 100.

$R^1$ and $R^2$ are preferably independently of one another linear or branched $C_1$-$C_6$-alkyl radicals which are more preferably straight chain.

Particularly preferably $R^1$ and $R^2$, independently of each other are methyl, ethyl, propyl or butyl, in particular methyl.

q is an integer which preferably ranges from 1 to 9, more preferably q is 1.

Most preferably the acetal of formaldehyde is methylal.

The amounts usually used of the acetal of formaldehyde in the method of the present invention is up to 50,000 ppm, preferably from 100 to 5,000 ppm, particularly preferably from 300 to 1,500 ppm, based on the monomer mixture.

The method for the preparation of oxymethylene polymers can alternatively be conducted in the presence of a polyhydric alcohol. Especially, if high hydroxyl-containing polyoxymethylene polymers are desired, the method is preferably carried out in the presence of a polyhydric alcohol. The term "high hydroxyl-containing" polyoxymethylene polymer is meant to refer to a polyoxymethylene having a ratio of hydroxyl end groups to total end groups greater than 50%, and preferably greater than 80% in the molecule. The quantity of hydroxyl groups in the molecules are determined, for example, by the technique described in Applied Polymer Science, 38, 87 (1989) which is expressly incorporated hereinto by reference.

Examples of polyhydric alcohols which can be used in the method of the present invention are preferably selected from the group consisting of partial esters of polyhydric alcohols, adducts of polyhydric alcohols or partial esters thereof with alkylene oxide, hydroxylated glycidyl ethers and glycidyl esters, hydroxylated cyclic acetals.

More preferably, the polyhdydric alcohol is selected from glycerine, trimethylolpropane, pentaerythritol, diglycerine, sorbitan, sorbitol, sorbitan monoester and diglycerin monoester and adducts thereof with alkylene oxide such as ethylene oxide, propylene oxide or butylenes oxide.

Especially preferred is the method of the present invention which is conducted in the presence of the polyhydric alcohol ethylene glycol.

The method of the present invention is preferably carried out by adding the initiator (heteropoly acid or an acid salt thereof which is dissolved in an alkyl ester of a polybasic carboxylic acid) to a mixture of the monomers (preferably trioxane and dioxolane) and the molecular weight regulator (an acetal of formaldehyde, preferably methylal) and optionally comonomers at temperatures above 65° C., preferably in a gas-tight polymerization reactor. The reaction mixture warms up as a result of the heat of crystallization of the precipitating polymer. If appropriate, further heat can be supplied so that a specified temperature profile (polymerization temperature as a function of the polymerization time) T=f(t)) can be established. The temperature profile can be established so that the reaction mixture is homogeneous again at the end of the polymerization.

Alternatively, the reaction can be conducted at atmospheric pressure (1 bar).

The raw polymer is worked up, any unstable terminal hemiacetal groups present are removed by hydrolysis and compounding and fabrication can be affected. These process steps are known to the person skilled in the art. A further embodiment of the present invention is an oxymethylene polymer which is obtainable by the method according to the present invention.

The oxymethylene polymers obtainable by the method according to the present invention preferably have a monomodal distribution of the molecular weight. Within the meaning of the present invention oxymethylene polymers having a monomodal distribution are understood as meaning those polymers which have essentially only one peak in the molecular weight distribution, the number average molecular weight Mn being present above 10,000 Dalton, more preferably above 25,000 Dalton and most preferably from 30,000 to 300,000 Dalton, especially preferably from 50,000 to 200,000 Dalton.

It has surprisingly been found that the oxymethylene polymers obtainable by the method according to the present invention have a low portion of low molecular weight oxymethylene polymers having a number average molecular weight Mn of less than 8,000 Dalton. According to a preferred embodiment of the present invention the oxymethylene polymer has a range of oxymethylene polymers having a number average molecular weight Mn of less than 8,000 Dalton which is less than 3% by weight, wherein the weight is based on the weight of the entire polymer.

In a preferred embodiment, the oxymethylene polymer is an oxymethylene copolymer wherein the copolymer comprises 0.05 to 0.5 mol %, preferably 0.1 to 3.0 mol %, based on oxymethylene units of the structure

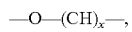

in which x is an integer from 2 to 8, preferably x is 2.

The molecular weights, characterized as melt volume rate (MVR), of the oxymethylene polymers according to the invention can be adjusted within certain ranges. Typical MVR values are from 0.1 to 100 cm$^3$/10 min, preferably 0.8 to 50 cm$^3$/10 min, particularly preferably from 2 to 10 cm$^3$/10 min, measured according to EN ISO 1133 at 190° C. under a load of 2.16 kg.

According to a preferred embodiment, the polyoxymethylene is a high hydroxyl-containing polyoxymethylene. Preferably, the polyoxymethylene is a polyoxymethylene in which at least 50% of the terminal groups are hydroxyl groups. The content of terminal hydroxyl groups and/or hydroxyl side groups (also referred to together as "terminal hydroxyl groups") is typically at least 50%, based on all terminal groups, preferably at least 70%. In the context of this description, the term "all terminal groups" is to be understood as meaning all terminal and, if present, all side terminal groups.

A further embodiment of the present invention is a molding material containing
  a) a polyoxymethylene obtainable by the method according to the present invention, and
  b) a thermoplastic elastomer.

Component b) is a thermoplastic elastomer which preferably has active hydrogen atoms.

These are to be understood as meaning those thermoplastic elastomers which are capable of forming covalent bonds to the hydroxyl groups of component a) and a coupling reagent optionally used as component c) under the chosen processing conditions.

Examples of thermoplastic elastomers are polyester elastomers (TPE-E), thermoplastic polyamide elastomers (TPE-A) and in particular thermoplastic polyurethane elastomers (TPE-U). These thermoplastic elastomers have active hydrogen atoms which can be reacted with the coupling reagents c). Examples of such groups are urethane groups, amido groups, amino groups or hydroxyl groups, for example of terminal polyester diol flexible segments of thermoplastic polyurethane elastomers which have hydrogen atoms which can react, for example, with isocyanate groups.

Particularly preferably used component b) are thermoplastic polyester elastomers (TPE-E), thermoplastic polyamide elastomers (TPE-A), thermoplastic polyurethane elastomers (TPU-U) or a combination of a plurality of these thermoplastic elastomers.

The presence of a coupling reagent c) is not essential but is preferred since the notched impact strength of the molding can be further increased thereby.

For the formation of bridging groups between the components a) and b), it is possible to use a very wide range of polyfunctional, preferably trifunctional or in particular bifunctional, coupling reagents c) which are capable of forming covalent bonds firstly with hydroxyl groups of component a) and secondly with the active hydrogen atoms of component b).

Component c) is preferably a diisocyanate, preferably an aliphatic, cycloaliphatic and/or aromatic diisocyanate.

Component c) may also be used in the form of oligmers, preferably trimers or in particular dimers, if appropriate as a mixture together with a polymer.

Examples of diisocyanates are aromatic diisocyanates, such as toluene diisocyanate, naphthalene diisocyanates, diphenylmethane 2,4'-diisocyanate or 4,4'-diisocyanato-diphenylmethane; or (cyclo)aliphatic diisocyanates, such as hexamethylenediisocyanate or isophorone diisocyanate.

The moldings produced from the oxymethylene polymers according to the invention have a high impact strength compared to polyoxymethylene polymers known in the prior art. The oxymethylene polymers of the present invention can be used in molding processes, for examples blow molding or injection molding.

The following examples explain the invention without limiting it.

EXAMPLE 1

According to the Invention

An initiator for cationic polymerization has been prepared by dissolving 12-tungsto phosphoric acid ($H_3PW_{12}O_{40}$) [CAS 12501-23-4] in dimethyl adipate (DMA). The concentration of the heteropoly acid in DMA was 0.2 weight percent.

30 μl of a 0.2 weight percent solution of the heteropoly acid ($H_3PW_{12}O_{40}$) in dimethyl adipate was added to 100 g of trioxane containing 100 ppm of methylal at 70° C. This corresponds to an initiator level of 0.6 ppm. The induction period was 10 to 20 seconds and the polymerization was complete in about 1 min. The raw material was taken from the beaker, crushed into pieces and weighted (raw polymer yield).

The raw polymer yield was 92% and the hydrolysis loss was 36%.

Overall yield of hydrolyzed polymer was 59% (based on trioxane).

MVR at 190° C. was 4.6 ml/10 min.

The GPC analysis shows no distinct peak for the low molecular weight fraction. The GPC trace is shown in FIG. 1 (Mw=180.000; Mn=31.000; D=5.80).

EXAMPLE 2 and COMPARATIVE EXAMPLE 1

A plant trial was conducted to manufacture high strength POM. Honda twin screw extruders were used. The following Table 1 summarizes the operating conditions used for comparative polymer 1 (Comparative Example 1) and Example 2 of the invention.

TABLE 1

|  | Example 2 | Comparative Example 1 |
|---|---|---|
| Trioxane Feed Rate | 20,000 lb/hr | 20,000 lb/hr |
| Methylal Concentration | 550 ppm | 350 |
| Dioxolane Concentration | 2,000 ppm | 3.2% |
| Initiator | HPA[1)] | $BF_3$ |
| $BF_3$ Concentration in Trioxane | | 10-20 ppm |
| HPA[1)] Concentration in DMA[2)] | 1000 ppm | — |
| HPA[1)] Concentration in Trioxane | 2 ppm | — |
| Reactor Screw Speed | 30 rpm | 30 rpm |

[1)]$H_3PW_{12}O_{40}$
[2)]dimethyl adipate

Figure 2:
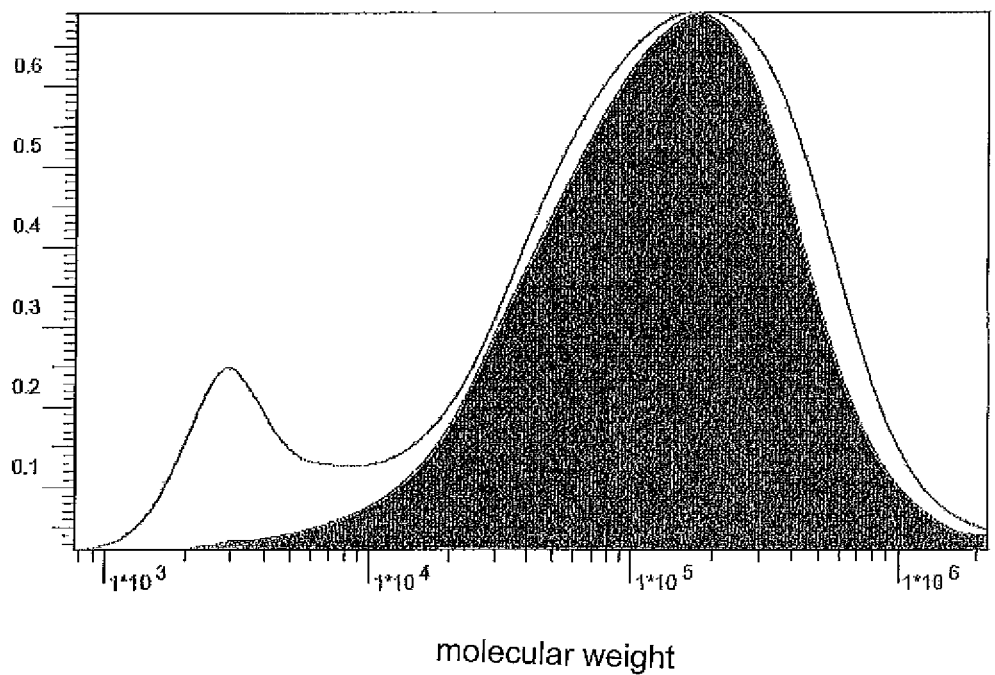
FIG. 2 is a Gel Permeation Chromatography (GPC) plot illustrating the results of Example 2 and Comparative Example 1.

At the conditions referred to in Table 1, Example 2 a polymer was produced with an acceptable low molecular weight fraction as is shown by the GPC curve shown in FIG. 2 (grey curve).

The molecular distribution of the polyoxymethylene polymer obtained by the process according to Comparative Example 1 shows a bimodal distribution (see FIG. 2, white curve) and the polymer obtained showed a much lower impact resistance compared to the polymer obtained by Example 2 (see Table 2).

TABLE 2

Charpy Notch Values of the Polymers Obtained
by Example 2 and Comparative Example 1

|  | Example 2 | Comparative Example 1 |
|---|---|---|
| Charpy Notch value @ 23° C. [kJ/m$^2$] | 15.5 | 10.1 |
| Charpy Notch value @ −30° C. [kJ/m$^2$] | 12.0 | 7.4 |

What is claimed is:

1. A method for the preparation of oxymethylene polymers comprising the following step:
   polymerization of a monomer, which forms —$CH_2$—O— units in the presence of
   i) an acetal of formaldehyde or a polyhydric alcohol and
   ii) an initiator for cationic polymerization
   wherein said initiator is a heteropoly acid or an acid salt thereof which is dissolved in an alkyl ester of a polybasic carboxylic acid.

2. The method according to claim 1, wherein the heteropoly acid is a compound represented by the general formula (1):

$$H_x[M_m M'_n O_z] \cdot y H_2O \quad (1)$$

wherein
M represents an element selected from the group consisting of P, Si, Ge, Sn, As, Sb, U, Mn, Re, Cu, Ni, Ti, Co, Fe, Cr, Th and Ce,
M' represents an element selected from the group consisting of W, Mo, V and Nb,
m is 1 to 10,
n is 6 to 40,
z is 10 to 100,
x is an integer of 1 or above, and
y is 0 to 50.

3. The method according to claim 1, wherein the heteropoly acid is a compound represented by the following formula:

$$H_x[M_m \cdot M'_n O_z] \cdot y H_2O$$

wherein
M represents an element selected from the group consisting of P and Si;
M' represents a coordinating element selected from the group consisting of W, Mo and V;
z is 10 to 100;
m is 1 to 10;
n is 6 to 40;
x is an integer of at least 1; and
y is 0 to 50.

4. The method according to claim 1, wherein the heteropoly acid is selected from the group consisting of phosphomolybdic acid, phosphotungstic acid, phosphomolybdotungstic acid, phosphomolybdovanadic acid, phosphomolybdotungstovanadic acid, phosphotungstovanadic acid, silicotungstic acid, silicomolybdic acid, silicomolybdotungstic acid, silicomolybdotungstovanadic acid and acid salts thereof.

5. The method according to claim 1, wherein the heteropoly acid is selected from 12-molybdophosphoric acid ($H_3PMo_{12}O_{40}$) and 12-tungstophosphoric acid ($H_3PW_{12}O_{40}$) and mixtures thereof.

6. The method according to claim 1, wherein the alkyl ester of a polybasic carboxylic acid is an alkyl ester of an aliphatic dicarboxylic acid of formula (2):

$$(ROOC)-(CH_2)_n-(COOR') \quad (2)$$

wherein
n is an integer from 2 to 12, and
R and R' represent independently from each other an alkyl group having 1 to 4 carbon atoms.

7. The method according to claim 1, wherein the alkyl ester of a polybasic carboxylic acid is a compound of formula (3):

$$(ROOC)_2-CH-(CH_2)_m-CH-(COOR')_2 \quad (3)$$

wherein
m is an integer from 0 to 10, and
R and R' are independently from each other alkyl groups having 1 to 4 carbon atoms.

8. The method according to claim 1, wherein the alkyl ester of a polybasic carboxylic acid is a compound of formula (4):

$$(ROOC)-C_6H_4-(COOR') \quad (4)$$

whereby R and R' represent independently from each other alkyl groups having 1 to 4 carbon atoms.

9. The method according to claim 1, wherein the alkyl ester of a polybasic carboxylic acid is selected from the group consisting of dimethyl glutaric acid, dimethyl adipic acid, dimethyl pimelic acid, dimethyl suberic acid, diethyl glutaric acid, diethyl adipic acid, diethyl pimelic acid, diethyl suberic acid, diemethyl phthalic acid, dimethyl isophthalic acid, dimethyl terephthalic acid, diethyl phthalic acid, diethyl isophthalic acid, diethyl terephthalic acid, butantetracarboxylic acid tetramethylester and butantetracarboxylic acid tetraethylester as well as mixtures thereof.

10. The method according to claim 1, wherein the melting point of the alkyl ester of the polybasic carboxylic acid is lower than 100° C.

11. The method according to claim 1, wherein the boiling point of the alkylester of the polybasic carboxylic acid at 1 bar is higher than 100° C.

12. The method according to claim 1, wherein the alkyl ester of the polybasic carboxylic acid does not contain a nitrogen atom.

13. The method according to claim 1, wherein the heteropoly acid is dissolved in the alkyl ester of the polybasic carboxylic acid in an amount ranging from 0.01 to 5 wt.%, wherein the weight is based on the entire solution.

14. The method according to claim 1, wherein formaldehyde or trioxane is used as monomer which forms —$CH_2$—O— units.

15. The method according to claim 1, wherein, as acetal of formaldehyde, a compound of the formula (5) is used $$R^1\text{—}(O\text{—}CH_2)_q\text{—}O\text{—}R^2 \tag{5}$$

in which
$R^1$ and $R^2$ represent independently of each other alkyl groups, and
q is an integer from 1 to 100.

16. The method according to claim 15, wherein, as acetal of formaldehyde, a compound of the formula (5) is used in which q=1.

17. The method according to claim 16, wherein as acetal of formaldehyde, methylal is used.

18. An oxymethylene polymer formed according to the method of claim 1.

19. The oxymethylene polymer according to claim 17, wherein the range of oxymethylene polymers having a number average molecular weight Mn of less than 8,000 Dalton is less than 3% by weight, wherein the weight is based on the weight of the entire polymer.

* * * * *